United States Patent [19]

Maidhof

[11] 4,354,299

[45] Oct. 19, 1982

[54] CLAMP FOR FASTENING GRAPEVINES AND OTHER FRUIT-BEARING SHRUBS ON BRACING WIRES

[75] Inventor: Georg Maidhof, Carlsberg, Fed. Rep. of Germany

[73] Assignee: Maidhof GmbH, Carlsberg, Fed. Rep. of Germany

[21] Appl. No.: 143,648

[22] Filed: Apr. 25, 1980

[30] Foreign Application Priority Data

Sep. 6, 1979 [DE] Fed. Rep. of Germany ....... 2935986

[51] Int. Cl.³ .............................................. A44B 21/00
[52] U.S. Cl. .................................... 24/261 R; 47/44; 403/397
[58] Field of Search ............. 24/261 R, 336; 403/397, 403/400; 47/44, 45, 46; 174/47

[56] References Cited

U.S. PATENT DOCUMENTS

| 562,947 | 6/1896 | Bennett et al. | 403/397 |
| 997,022 | 7/1911 | Tennant et al. | 24/261 |
| 2,315,825 | 4/1943 | Tallman | 403/397 |
| 3,359,019 | 12/1967 | Pinkney | 403/397 |
| 3,494,071 | 2/1970 | Simmon | 47/44 |
| 3,494,072 | 2/1970 | Olson | 47/44 |

FOREIGN PATENT DOCUMENTS

| 171469 | 11/1903 | Fed. Rep. of Germany . |
| 2451558 | 5/1976 | Fed. Rep. of Germany . |
| 2275992 | 1/1976 | France | 47/44 |
| 2433900 | 4/1981 | France | 47/44 |

Primary Examiner—William F. Pate, III
Attorney, Agent, or Firm—McAulay, Fields, Fisher, Goldstein & Nissen

[57] ABSTRACT

Clamp for fastening grapevines and other fruit-bearing shrubs on bracing wires comprising a detent at one end of the clamp to engage the bracing wire, a hook at the other end of the clamp to engage the bracing wire and an intermediate piece between the detent and the hook. The intermediate piece is formed of an elastic plastic and includes two arms which form therebetween an included obtuse angle. The detent and the hook project perpendicularly from the plane formed by the two arms. The hook and the detent are arranged on the same side of the plane formed by the two arms, and the arm to which the detent is connected lie in a common plane.

17 Claims, 4 Drawing Figures

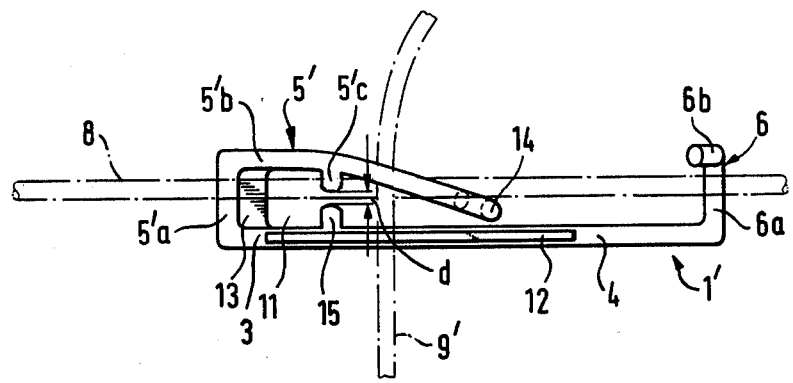
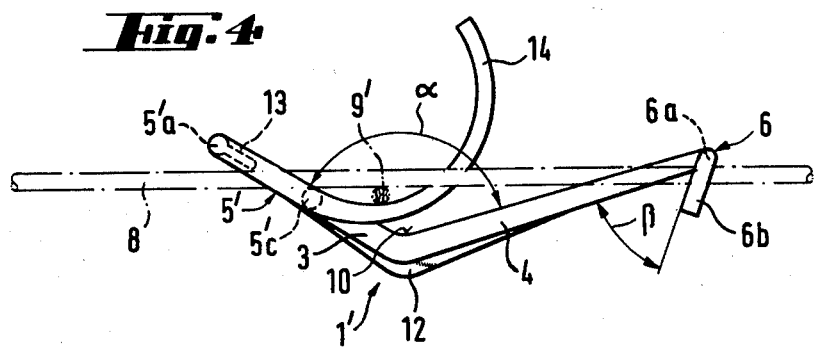

CLAMP FOR FASTENING GRAPEVINES AND OTHER FRUIT-BEARING SHRUBS ON BRACING WIRES

BACKGROUND OF THE INVENTION

1. Field of the Invention

This invention relates to clamps for fastening grapevines and other fruit-bearing shrubs on bracing wires.

More particularly, the invention is concerned with a clamp which includes a detent at one end and a hook at the other end which cooperates with a bracing wire which together are usable to fasten grapevines and other fruit-bearing shrubs.

2. Description of the Prior Art

In the past, grapevines have been secured on bracing wires with willow rods, strings or bast which was time-consuming and therefore expensive. From German Pat. No. 171,469, it is known to use bent wire clamps which includes a double wound spiral with parallel projecting resilient ends with which the vine can be secured by crossing substantially parallel to a bracing wire on the latter. A drawback of this type of clamp is the relatively great material consumption, relatively great production costs, and the risk that the vine will not be sufficiently secured, moving in the wind and being exposed to harmful friction.

It is also known to provide a wire clamp which has a clamping means at both ends with which it is clamped on the bracing wire. Between the two clamping means an intermediate piece extends which has the form of a stirrup. The vine is held with ample clearance between the stirrup and the bracing wire. This clamp is firmly secured on the bracing wire, but it is difficult to handle as well as being relatively elaborate to manufacture, and it has the drawback that the vine is subject to friction due to the bracing wire and as well as due to the clamp.

It is therefore an object of the invention to provide a clamp for fastening grapevines or other fruit-bearing shrubs on bracing wires, which is inexpensive to manufacture, simple to handle, and versatile in use, and in which the vine is so fixed on the bracing wire that it neither rubs on the bracing wire nor rubs on the clamp.

SUMMARY OF THE INVENTION

This problem is solved according to the invention by providing a clamp having a detent at one end and a hook portion at the other end of a pair of angled and connected arms. The detent and hook are adapted to engage a bracing wire and hold a vine or shrub between the angled arms and the bracing wire with the detent and hook holding and spring-biasing the bracing wire towards the angled arms. The angle between the arms is an obtuse angle.

The detent is an open structure for embracing the bracing wire, into which the bracing wire can be introduced and from which it can be removed only under elastic deformation of the structure.

Such a clamp can be made in one piece in a single operation by injection molding from a sufficiently dimensionally stable and elastic plastic (e.g. "Makrolon"), and is simple to handle. First the clamp is attached with its detents onto the bracing wire on which it then hangs undetachably, but movably. Then, the clamp is grasped at its free end and is placed around the vine in such a way that the latter comes to lie in the apex of the angle formed by the angular connection between the two arms of the clamp, and the free end of the clamp provided with the attached hook also is brought into engagement with the bracing wire. The clamp is slightly tensioned elastically, so that the vine is clamped between the apex of the clamp and the bracing wire, and can move neither in the direction of the hook nor in the direction of the detent. Because of the elastic tension of the clamp after the vine has been clamped onto the bracing wire, friction contact or engagement is produced between the clamp and the bracing wire, which prevents accidental displacement of the clamp along the bracing wire.

In order to detach the vine from the bracing wire, it is only necessary to detach the clamp from the bracing wire. The clamp itself remains undetachably connected with the wire by means of the detent, and can thus be used over and over for a long period of many years in order to clamp vines onto the bracing wire.

In order to secure the clamp firmly onto the bracing wire, both the detent and the hook project perpendicularly from the plane formed by the two arms, and both are arranged on the same side of the plane formed by the two arms. The detent and the arm from which it projects also lie in a common plane. The detent is also simple to produce and also simple to handle. Provided with such detent, the clamp can be easily moved on the bracing wire as long as it is not engaged with its hook. In particular, the detent according to one modification has the form of an arc which starts at the end of the arm from which it extends and ends in a distance, which is less than the diameter of the bracing wire and laterally before the arm, the inside width of the arc being so dimensioned that the arc can embrace the bracing wire with clearance.

In another modification of the invention the detent has the form of an arc which starts at the end of one arm and extends firstly a certain distance in a plane which contains the aforesaid arm and approaches this arm in the range of this plane for the formation of the detent except for a small distance or spacing which is less than the diameter of the bracing wire, while ahead of it the inside width of the arm is so dimensioned that it can embrace the bracing wire with clearance, and a spring-elastic extension extends from the detent and extends in a plane parallel to the plane of two arms and the detent is arranged on the same side of the clamp in which the two arms have included therebetween the obtuse angle which is less than 180 degrees. This clamp is additionally provided with an extension on the notch which extends parallel to the two arms of the clamp and which is preferably curved. This clamp is particularly suitable for thin young vines which are still so slim that they cannot yet be clamped tightly between the two arms of the clamp and the bracing wire. This curved extension ensures a firm seat of the clamp if it is so attached onto the bracing wire so that the curved extension from the detent and the hook which extends from the other arm of the clamp are on opposite sides of the bracing wire.

The obtuse angle between the two arms, and the length of these arms are so dimensioned and adapted to each other that when the clamp is engaged stress-free in the bracing wire with hook and detent, the distance between the apex of the obtuse angle and between the two arms and the bracing wire is less than the diameter of the vine.

When the arms of the clamp are provided with different lengths, the longer arm in particular can produce the required easy elastic spring action without the clamp having to be weakened at any point. At the same time, the handling of the clamp is facilitated, particularly when it has the hook at the end of the longer arm.

The hook is preferably L-shaped and forms an acute angle with the arm on which it is arranged, so that the hook embraces the bracing wire with an angle close to 90 degrees.

Other objects, and advantages of the invention will become readily apparent from the detailed description of the invention taken in connection with the accompanying drawings:

BRIEF DESCRIPTION OF THE DRAWINGS

FIG. 3 is a side elevational view of another embodiment of the clamp according to the invention; and, FIG. 4 is a top view of the clamp of FIG. 3.

DESCRIPTION OF THE PREFERRED EMBODIMENTS

Figure 1:
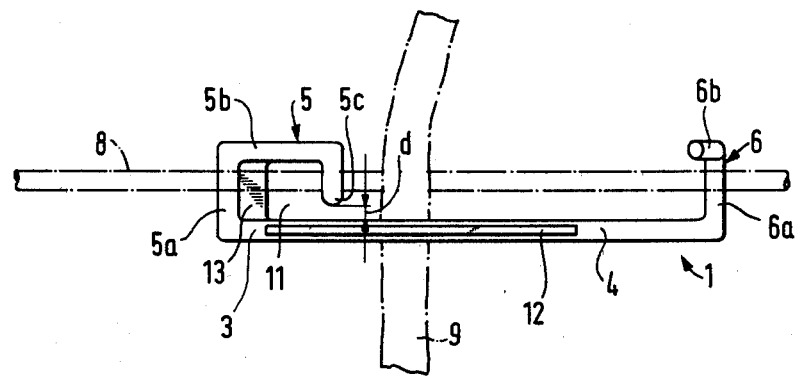
FIG. 1 is a side elevational view of one embodiment of a clamp according to the invention arranged on the bracing wire.

Referring now more particularly to the drawings in which like reference numerals throughout indicate the same elements in both embodiments of clamps 1 and 1' and the primed reference numerals designate modifications.

Figure 2:
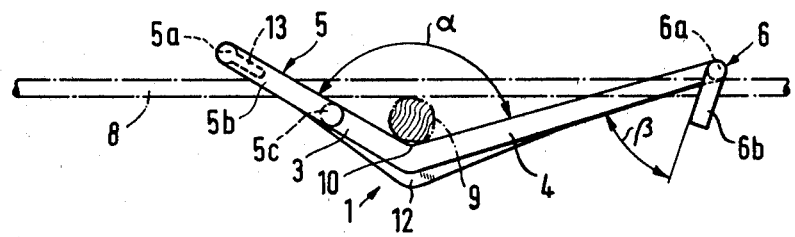
FIG. 2 is a top view of the clamp of FIG. 1.

As best seen in FIGS. 1 and 2, clamp 1 comprises two arms 3,4 of different length angularly spaced from each other with an obtuse angle (alpha)$\alpha$ and connected at the junction or apex 10 in order to receive a young vine 9 which is held to apex 10 by means of a bracing wire 8. An outer rib strengthening member 12 is provided on a side opposite to the junction or apex 10 forming the included obtuse angle alpha, preferably between 120 and 105 degrees.

In order to hold bracing wire 8 against vine 9 so as to nestle vine 9 in the apex 10 for holding thereof between arms 3 and 4, arm 3 is provided at an end thereof with a stirrup shaped detent 5, and arm 4 is provided with an L-shaped hook 6; detent 5 and hook 6 are each angled so that one is on an opposite side from the other relative to the unit formed by the combination of arms 3,4, and each have springy portions which lie in the same plane so that they are coplanar to hold bracing wire 8.

Clamp 1 is made of elastic plastic by injection molding, and the two arms 3,4 of different length, and form with each other a preferred obtuse angle alpha of about 140 degrees. Arm 3 is shorter than arm 4. Stirrup-shaped detent 5 is arranged at the end of short arm 3 and comprises a C or U-shaped member including a first strap 5a starting from the end of short arm 3 and extends vertically as shown in FIG. 1 on a plane extending through two arms 3,4, a second strap 5b adjoining and extending from strap 5a parallel to short arm 3, and a third strap forming an adjoining nose 5c extending from strap 5b toward short arm 3 parallel to strap 5a, so that the complete detent 5 and short arm 3 lie in a common plane. Nose 5c is spaced from arm 3 a distance d to provide an entry into an opening 11. Opening 11 is substantially closed by detent 5 and is so dimensioned that bracing wire 8 can be arranged therein with plenty of clearance. But, the distance d between nose 5c and short arm 3 is dimensioned so that the entry is so small that bracing wire 8 can only be introduced into opening 11 by the elastic bending of nose 5c away from short arm 3 and possibly out of the plane formed by arm 3 and straps 5a, 5b and 5c.

Hook 6 is L-shaped and is arranged at the end of long arm 4. L-shaped hook 6 comprises a strap 6a having one end connected with the end of long arm 4 extending in the same direction as strap 5a and detent 5 and arranged on the same side of the plane formed by the two arms 3 and 4; strap 6a extends likewise perpendicularly to this plane formed by arms 3,4. Strap 6a is joined by a short piece or extension 6b which as best seen in FIG. 2 forms with long arm 4 an acute angle (beta)$\beta$ in such a way that, when clamp 1 engages bracing wire 8, hook 6 embraces the bracing wire with an angle of almost 90 degrees. Piece or extension 6b of hook 6 is arranged on the side of long arm 4 remote from angle alpha. Extension 6b extends from hook 6 in a direction out of the plane formed by arms 3,4 and in a plane parallel to the plane of arms 3,4 and in a direction opposite or away from the extension of stirrup detent 5, but in a direction towards detent 5. The angle of 90 degrees is formed between extension 6b and bracing wire 8.

When vine 9 is secured, it lies in apex 10 of clamp 1 and is clamped elastically between clamp 1 and bracing wire 8. To this end, the angle alpha between the two arms 3 and 4 and the length of these two arms 3 and 4 are so dimensioned that the distance between apex 10 of the clamp and bracing wire 8 in the unclamped state, that is, with a clamp 1 which engages bracing wire 8 without the interposition of vine 9, is less than the diameter of vine 9 thereby to provide a clamping action between wire 8 and arms 3,4.

In order to stiffen clamp 1, in addition to outer rib 12 provided in the range of and along both sides of apex 10, upright strap 5a of detent 5 is provided with an inner rib 13.

Referring now more particularly to FIGS. 3 and 4 which shows clamp 1' with a modified detent 5' cooperating with a nose portion 15 extending inwardly thereof from arm 3. Nose portion 15 cooperates with strap or adjoining nose 5'c to provide a free space d therebetween and has a curved spring elastic extension 14 directed inwardly towards arm 4 and out of the plane formed by arms 3,4 but in a plane parallel thereto and the plane formed by straps 5'a, 5'b and 5'c.

Curved extension 14 is bent out of alignment with strap 5'b with strap 5'c forming a protrusion between the connection between extension 14 and strap 5'b.

Clamp 1' as shown in FIGS. 3 and 4 differs from clamp 1 shown in FIGS. 1 and 2 only in that detent 5' has curved extension 14 which extends in a plane parallel to arms 3 and 4 and preferably in the same plane in which short piece 6b extends or lies. Extension 14 projects steadily from the end of strap 5b' of detent 5 and extends in an arc way from arms 3 and 4 in such a width that a thin young vine 9' can still be clamped between this arc and bracing wire 8. When clamp 1' is mounted on bracing wire 8, it is mounted so that extension 14 and piece 6b of hook 6 are on opposite sides of bracing wire 8 so that extension 14 and piece 6b are no longer coplanar. In this way, extension 14 is bent elastically in the direction of the plane of arms 3 and 4, so that bracing wire 8 is clamped elastically between hook 6 and strap 5b', on the one hand, and extension 14 on the other hand. At the same time nose 5'c approaches the end of strap 5'b of nose 15 provided directly on and extending from short arm 3, which is opposite the other nose 5'c. The distance d between these two noses 5'c and 15, which form the inlet of detent 5', is so selected that it is smaller than the diameter of bracing wire 8. After pushing bracing wire 8 through the two noses 5'c and 15 into detent 5', the latter embraces bracing wire 8 with clearance.

Since extension 14 is on the side of clamp 1' opposite short piece 6b, it prevents hook 6 from sliding down bracing wire 8.

In both embodiments, the clamp for fastening grapevines and other fruit-bearing shrubs on bracing wires, includes the detent 5,5' at one end to engage the bracing wire, and an intermediate piece formed by arms 3,4 between the detent and the hook. The intermediate piece is formed of the elastic plastic includes the included obtuse angle alpha. The detent 5,5' and the hook 6 project perpendicularly from the plane formed by the two arms 3,4. Hook 6 and detent 5,5' are arranged on the same side of the plane formed by the two arms 3,4. Also, detent 5,5' and the arm 3 at the end of which the detent 5,5' is arranged lie in a common plane.

Detent 5 has the form of an arc which starts at the end of the arm and ends in a distance, which is less than the diameter of the bracing wire 8, laterally before arm 3 where the detent 5 is provided. The inside width of the arc is so dimensioned that the arc can embrace the bracing wire 8 with clearance.

Detent 5' also forms an arc which starts at the end of the arm 3 is provided and extends at first a certain distance in a plane for the formation of the detent 5' except for a distance which is less than the diameter of the bracing wire 8, while ahead of it the inside width of the arm is so dimensioned that it can embrace the bracing wire 8 with clearance, and spring-elastic extension 14 extends in a plane parallel to arms 3,4 and is arranged to the same side as the included obtuse angle alpha. The angle alpha between the arms 3,4 and the length of arms 3,4 are so dimensioned and adapted to each other that when the clamp 1,1' is engaged in a stress-free condition with the bracing wire with hook 6 and detent 5,5' engaged with bracing wire 8, the distance between the apex 10 of the obtuse angle alpha and between arms 3,4 and bracing wire 8 is less than the diameter of the vine 9. Hook 6 and arm 4 together form acute angle beta in the top view of the plane extending through arms 3,4, which angle beta is arranged on the side of the arm 4 remote from the angle alpha between the arms 3,4.

It will be obvious to those skilled in the art that various changes and modifications may be made therein without departing from the scope of the invention.

What is claimed is:

1. A clamp for fastening grapevines and other fruit-bearing shrubs onto a bracing wire, comprising
   a pair of angularly connected arms, each of said arms having a free end forming an intermediate piece;
   a detent connected at the free end of one of said arms for engagement thereof with the bracing wire;
   said detent being in the form of an arc member starting from said one end of said one arm and extending for a predetermined distance in a plane containing said one arm;
   the other end of said arc member approaching said one arm but spaced therefrom in said last-mentioned plane a predetermined distance less than the diameter of the bracing wire;
   a hook connected at the free end of the other of said arms for engagement thereof with the bracing wire; and,
   said intermediate piece being formed from a resilient material with said two arms being angularly spaced from each other with an obtuse angle whose apex is the straight directional lines extension of said two arms.

2. The clamp according to claim 1, wherein
   said detent and said hook project perpendicularly from a plane formed by said two arms.

3. The clamp according to claim 1, wherein
   said detent and said hook are positioned on the same side of a plane containing said two arms.

4. The clamp according to claim 1 or 3, wherein
   said detent and said one arm are positioned in a common plane.

5. The clamp according to claim 1, wherein
   said detent is in the form of an arc and has a first end connected with said one arm and a second end spaced from said one arm;
   the extent of the spacing of said second end from said one arm being less than the outer diametrical extent of the bracing wire; and,
   the maximum diametrical extent or width of said arc is greater than the outer diametrical extent of the bracing wire for embracement thereof with clearance.

6. Clamp according to claim 1, including:
   a spring-like extension connected with said other end of said arc member and extending in a plane parallel to a plane containing said arms and positioned on the same side of said intermediate piece having the obtuse angle between said arms.

7. The clamp according to claim 1, wherein
   said two arms of said intermediate piece are angularly related and lengthwise dimensioned to form a spacing between the apex of the obtuse angle and the bracing wire when the bracing wire is held in a stress-free condition by said detent and said hook which spacing is less than the diameter of the vine to be engaged.

8. The clamp according to claim 1, wherein
   said obtuse angle is between 120 and 150 degrees.

9. The clamp according to claim 1, wherein each of said two arms have different lengths.

10. The clamp according to claim 9, wherein
    said detent is provided at the end of said short arm and said hook is connected at the end of said long arm.

11. The clamp according to claim 1, wherein
    said hook together with said other arm forms an acute angle in a plane extending through said arms, said acute angle being arranged on the side of said other arm remote from said obtuse angle.

12. The clamp according to claim 1, wherein
    said hook is L-shaped.

13. A clamp for fastening grapevines and other fruit-bearing shrubs onto a bracing wire, comprising
    a pair of angularly connected arms, each of said arms having a free end and together forming an intermediate piece;
    a detent connected at the free end of one of said arms for engagement thereof with the bracing wire;
    a hook connected at the free end of the other of said arms for engagement thereof with the bracing wire; and,
    said intermediate piece being formed from an elastic plastic material with said two arms being angularly spaced from each other by an obtuse angle formed at their intersection;
    said detent being in the form of an arc member starting from said one end of said one arm and extending for a predetermined distance in a plane containing said one arm;

the other end of said arc member approaching said one arm but spaced therefrom in said last-mentioned plane a predetermined distance less than the diameter of the bracing wire;

the inside diameter of said arc being greater than the diameter of said bracing wire; and, a spring-like extension connected with said other end of said arc member and extending in a plane parallel to a plane containing said arms and positioned on the same side of said intermediate piece having the obtuse angle between said arms.

14. The clamp according to claim 13, wherein said detent and said hook project perpendicularly from a plane formed by said two arms.

15. The clamp according to claim 13, wherein said detent and said hook are positioned on the same side of a plane containing said two arms.

16. The clamp of claim 13, wherein said obtuse angle is between 120 and 130 degrees.

17. The clamp according to claim 13, wherein said detent and said one arm are positioned in a common plane.

* * * * *